United States Patent
Li et al.

(10) Patent No.: US 8,609,224 B2
(45) Date of Patent: Dec. 17, 2013

(54) FASTENING ASSEMBLY

(75) Inventors: Nai-Yi Li, Taipei Hsien (TW); Kuo-Jung Chung, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1112 days.

(21) Appl. No.: 12/107,778

(22) Filed: Apr. 23, 2008

(65) Prior Publication Data

US 2009/0148662 A1   Jun. 11, 2009

(30) Foreign Application Priority Data

Dec. 6, 2007   (CN) .......................... 2007 1 0202860

(51) Int. Cl.
*B32B 3/24* (2006.01)
*F02F 7/00* (2006.01)

(52) U.S. Cl.
USPC ........ 428/137; 428/141; 428/457; 123/195 C; 123/196 R

(58) Field of Classification Search
USPC ........... 428/141, 137, 457; 123/195 C, 196 R
See application file for complete search history.

(56) References Cited

U.S. PATENT DOCUMENTS

| | | | | |
|---|---|---|---|---|
| 4,226,550 A | * | 10/1980 | Kupcak et al. | 403/157 |
| 6,030,570 A | * | 2/2000 | McLaughlin | 264/279 |
| 6,280,816 B1 | * | 8/2001 | McCooey | 428/71 |
| 6,575,054 B2 | | 6/2003 | Sugiyama et al. | |
| 6,607,681 B1 | | 8/2003 | Ito et al. | |
| 2003/0152745 A1 | * | 8/2003 | Wagenblast | 428/119 |
| 2007/0148411 A1 | * | 6/2007 | Yamada | 428/172 |

FOREIGN PATENT DOCUMENTS

| | | |
|---|---|---|
| CN | 101070450 | 11/2007 |
| CN | 101070450 A | 11/2007 |
| CN | 101313087 | 11/2008 |
| CN | 101313087 A | 11/2008 |
| EP | 0892074 | 1/1999 |
| EP | 0892074 A1 | 1/1999 |
| EP | 1623824 | 2/2006 |
| EP | 1623824 A1 | 2/2006 |
| EP | 1944389 | 7/2008 |
| EP | 1944389 A1 | 7/2008 |
| EP | 2065179 | 6/2009 |
| EP | 2065179 A1 | 6/2009 |
| GB | 2433719 | 7/2007 |
| JP | 61-276982 | 12/1986 |
| JP | 61276982 | 12/1986 |
| JP | 11-115786 A | 4/1999 |

(Continued)

*Primary Examiner* — William P Watkins, III
(74) *Attorney, Agent, or Firm* — Altis & Wispro Law Group, Inc.

(57) ABSTRACT

A fastening assembly includes a magnesium alloy member, a metallic sheet defining a through hole, a metallic bolt, and a nut positioned on an end of the bolt and attached to the metallic sheet. The magnesium alloy member includes a magnesium alloy base, and at least one resin coating layer formed in at least one portion of the magnesium alloy base. The magnesium alloy member defines a through hole penetrating through the magnesium alloy base and the at least one resin coating layer. The metallic bolt extends through the through holes of the magnesium alloy base and the metallic sheet. An inner width of the through hole of the magnesium alloy member is greater than a width of the metallic bolt, a material of the metallic bolt is different from a material of the magnesium alloy base or a material of the metallic sheet.

4 Claims, 5 Drawing Sheets

(56) References Cited

FOREIGN PATENT DOCUMENTS

| | | |
|---|---|---|
| JP | 2003/105593 A | 4/2003 |
| JP | 2003105593 | 4/2003 |
| JP | 2005-288993 A | 10/2005 |
| JP | 2005288993 | 10/2005 |
| JP | 2006-51801 A | 2/2006 |
| JP | 2006/051801 A | 2/2006 |
| JP | 2006051801 | 2/2006 |
| JP | 2007-002331 A | 1/2007 |
| JP | 2007-2331 A | 1/2007 |
| JP | 2007-015337 A | 1/2007 |
| JP | 2007002331 | 1/2007 |
| JP | 2007015337 | 1/2007 |
| TW | 496823 | 8/2002 |
| WO | WO2008/026236 A1 | 3/2008 |
| WO | WO2008026236 | 3/2008 |

\* cited by examiner

FASTENING ASSEMBLY

BACKGROUND OF THE INVENTION

1. Field of the Invention

The present invention relates, generally, to a magnesium alloy member, and particularly to a magnesium alloy member superior in corrosion resistance.

2. Discussion of the Related Art

Magnesium alloys have been attracting attention as having a number of excellent practical properties for use as structural materials. Magnesium is practically lighter, stronger, and stiffer than iron and aluminum. Magnesium alloys have highest capability in absorbing vibrations (damping capacity) among popular metal materials (Fe, Al and so on), highly resistant to dint, less likely to deform with time or temperature, and easily recyclable. For these reasons, magnesium alloy is suitable as structural material for vehicles and for housing of portable terminals.

Because magnesium alloy is the most common popular alloy, when screwed or fastened together with different metals such as iron and aluminum, electrolytic corrosion is likely due to moisture in electrolytes in rain, melted snow, salt, etc. In particular, inside the hood and on the inside surface of the body of automobiles, electrolytic corrosion happens more frequently due to the electrolytes. Electrolytic corrosion may cause fastened parts to be come loosened/detached.

Referring to FIG. 5, a typical AZ91D magnesium alloy sheet 12 and a metallic sheet 14 are fastened with a steel bolt 16 and a nut 17 between three aluminum washers 18. In order to decrease electrolytic corrosion between the magnesium alloy sheet 12, the bolt 16 and the washers 18, the washers 18 may be insulated by anodic oxidation, or, the steel bolt 16 may be coated with resin. However, performing anodic oxidation on the washers 18 is very expensive, and the bonding strength and durability on resin coated steel bolts 16 is weak.

What is needed, therefore, is a new magnesium alloy member that can decreasing electrolytic corrosion when contact with different metals. A method for making the new magnesium alloy is also desired.

SUMMARY

In one aspect, a magnesium alloy member superior in corrosion resistance according to a preferred embodiment includes a magnesium alloy base, at least one resin coating layer formed in at least one portion of the magnesium alloy base.

In another aspect, a method for making the magnesium alloy member described in a previous paragraph includes: providing a magnesium alloy base; forming at least one resin coating layer on at least a part of surfaces of the magnesium base.

Other advantages and novel features will become more apparent from the following detailed description of the preferred embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present magnesium alloy member superior in corrosion resistance and method for making the magnesium alloy. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present magnesium alloy member superior in corrosion resistance and methods for making the magnesium alloy member, in detail.

Figure 1:
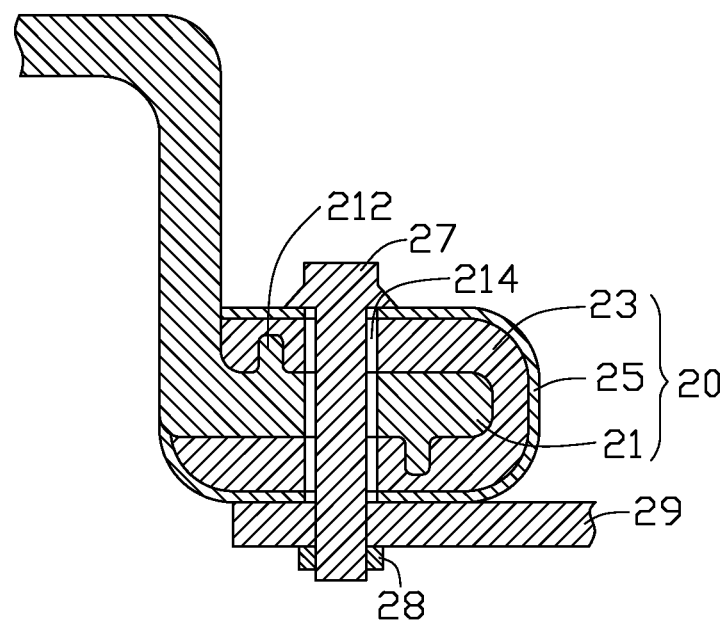
FIG. 1 is a partial cross-sectional view of a magnesium alloy member according to a first preferred embodiment of the present invention, the magnesium alloy member coupled with a metallic sheet by a bolt and a nut of a dissimilar material.

Referring to FIG. 1, a magnesium alloy member 20 in accordance with a first preferred embodiment of the present invention is shown. The magnesium alloy member 20 and a metallic sheet 29 are fastened together using a steel bolt 27 and a nut 28 to form a fastening assembly (not label). The magnesium alloy member 20 includes a magnesium alloy base 21, a polyethylene foam layer 23 and a polyethylene rigid layer 25. In this embodiment, the magnesium alloy base 21 further includes a plurality of micro-protrusions 212 protruding from opposite surfaces of a fastening end of the magnesium alloy base 21. The polyethylene foam layer 23 and the polyethylene rigid layer 25 are coated around the fastening end in that order. A thickness of the polyethylene foam layer 23 is thicker than a height of the micro-protrusions 212. In other words, the micro-protrusions 212 are embedded in the polyethylene foam layer 23, and this increases the bonding strength between the magnesium alloy base 21 and the polyethylene foam layer 23. The polyethylene rigid layer 25 completely covers and protects the polyethylene foam layer 23.

The fastening end of the magnesium alloy member 20 and the metallic sheet 29 defines a through hole 214 correspondingly. The magnesium alloy member 20 and the metallic sheet 29 are fastened tightly by inserting the bolt 27 through the through hole 214 and tightening the nut 28 on the end of the bolt 27. In this embodiment, an inner width of the through hole 214 of the magnesium alloy member 20 is greater than a width of the steel bolt 27, such that the steel bolt 27 can be inserted and bolted without coming in contact with an inside surface of the magnesium alloy base 21.

In alternative embodiments, the magnesium alloy base 21 may define a plurality microstructures, including grooves, through holes, or embossed microstructures instead of the micro-protrusions 212. The microstructures also increase the bonding strength between the magnesium alloy base 21 and the polyethylene foam layer 23.

A method for making the magnesium alloy member 20 includes following steps:

Firstly, a magnesium alloy base 21 is manufactured by casting, forging, or extrusion molding methods to form any shape. In this embodiment, the magnesium alloy base 21 is L-shaped. The magnesium alloy base 21 has micro-protrusions 212 formed at opposite surfaces of the fastening end thereof.

Figure 2:
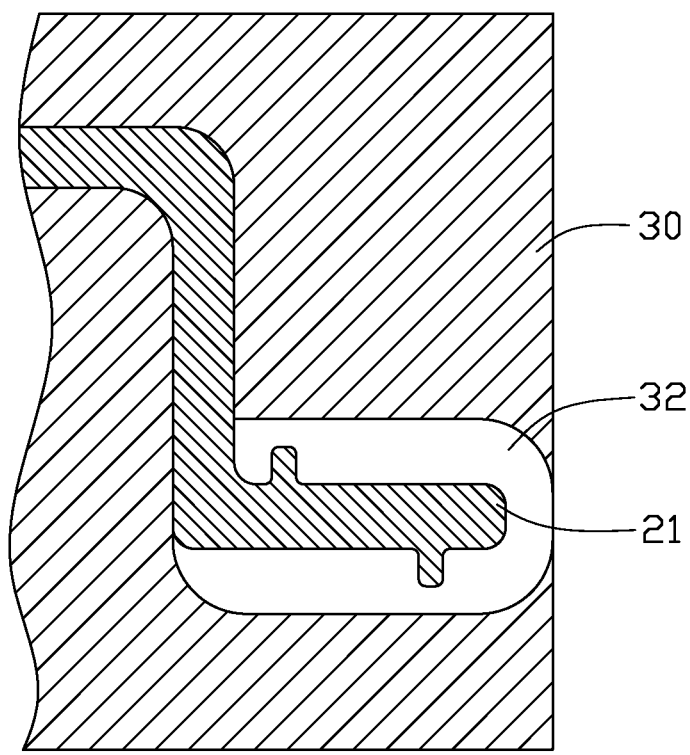
FIG. 2 is a partial cross-sectional view of a mold for making the magnesium alloy member of FIG. 1 with a magnesium alloy preform in the mold.

Secondly, the polyethylene foam layer 23 is coated around the end portion of the magnesium alloy base 21. Referring to FIG. 2, a mold 30 and an injection machine (not shown) is provided. The mold 30 has a first cavity 32. The end portion of the magnesium alloy base 21 having the micro-protrusions 212 is positioned in the first cavity 32 for defining a suitable space to form the polyethylene foam layer 23. A feed substantially consisting of about 90% wt. of polyethylene pellets to about 10% wt. of foaming agent (such as sodium bicarbonate) is uniformly mixed. This feed is fed to a heating cylinder (not shown) of the injection machine and heated to a melted state of about 90° C. degrees. When the feed is heated, carbon dioxide gas is produced from the sodium bicarbonate and enters the melted feed, thereby forming a plurality of air pockets in the melted feed. The melted feed is pushed by the elongated screw of the injection machine at a relative high pressure to shot out via a nozzle of the injection machine into the first cavity 32 of the mold 30. After cooling the mold 30, a polyethylene foam layer 23 coats around the fastening end of the magnesium alloy base 21 (a magnesium alloy preform) is achieved.

Thirdly, the polyethylene rigid layer 25 is coated around the polyethylene foam layer 23 of the magnesium alloy preform. This step is similar to the previous step of forming the polyethylene foam layer 23. A second mold (not shown) having a second cavity (not shown) is provided. The end portion forming the polyethylene foam layer 23 of the second magnesium alloy preform is positioned in the second cavity having a shape of the polyethylene rigid layer 25. Polyethylene pellets are fed to the heating cylinder of the injection machine for heating the polyethylene to a melted state of about 95° C. degrees. The melted polyethylene is pushed by the elongated screw at a relative high pressure to shot out via a nozzle of the injection machine into the second cavity of the second mold. Finally, after cooling the mold, a polyethylene rigid layer 25 on the polyethylene foam layer 23 is produced.

In use, the bolt 27 is insulated from the magnesium alloy base 21 with the polyethylene foam layer 23 and the polyethylene rigid layer 25, accordingly, electrolytic corrosion between the magnesium alloy member 20 and the bolt 27 is reduced, or even eliminated (prevented). The polyethylene foam layer 23 is configured for insulating the magnesium alloy base 21 and further having good heat resistance property. The polyethylene rigid layer 25 has a good mechanical strength for protecting the polyethylene foam layer 23. The magnesium alloy member 20 is suitable for a structural element for vehicles.

Figure 3:
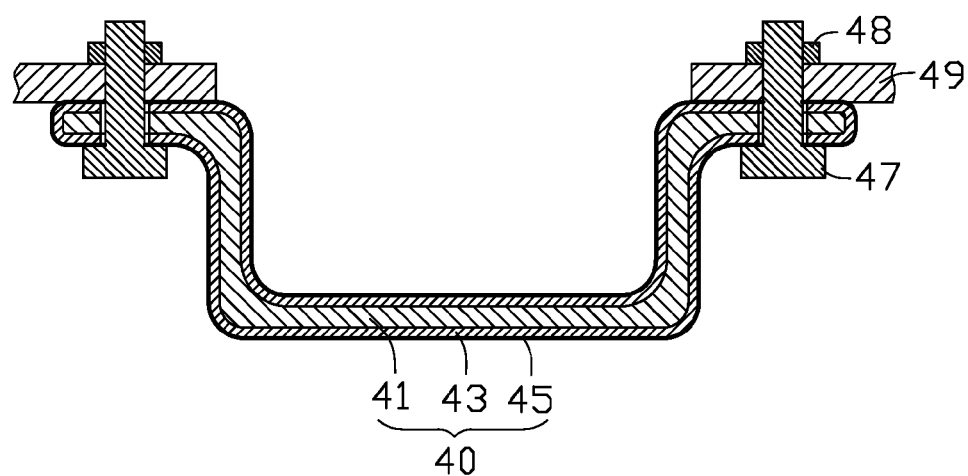
FIG. 3 is a partial cross-sectional view of a magnesium alloy member according to a second preferred embodiment of the present invention, the magnesium alloy member coupled with two metallic members by a bolt and a nut of a dissimilar material.

Referring to FIG. 3, a magnesium alloy member 40 in accordance with a second preferred embodiment of the present invention is shown. The magnesium alloy member 40 is used as an oil pan for protecting an engine of automobile. The magnesium alloy member 40 includes a magnesium alloy base 41, a methylene di-phenyl diisocyanate foam layer (hereinafter named MDI foam layer) 43 and a polyurethane rigid layer (hereafter named PU rigid layer) 45. The magnesium alloy base 41 has a hat-shaped with a hat flange cross-section. The MDI foam layer 43 and the PU rigid layer 45 are respectively coated surfaces of the magnesium alloy base 41 in that order. A thickness of the MDI foam layer 43 is greater than that of the PU rigid layer 45. The MDI foam layer 43 is configured for increasing heat resistance character. PU rigid layer 45 is configured for protecting the MDI foam layer 43 and providing rigid character.

Two ends of the magnesium alloy member 40 are respectively fastened to two metallic members 49 of dissimilar material with two bolts 47 and two nuts 48.

A method for making the magnesium alloy member 40 includes following steps.

Firstly, a magnesium alloy base 41 is manufactured by casting, forging, or extrusion molding methods to form different predetermined shapes.

Figure 4:
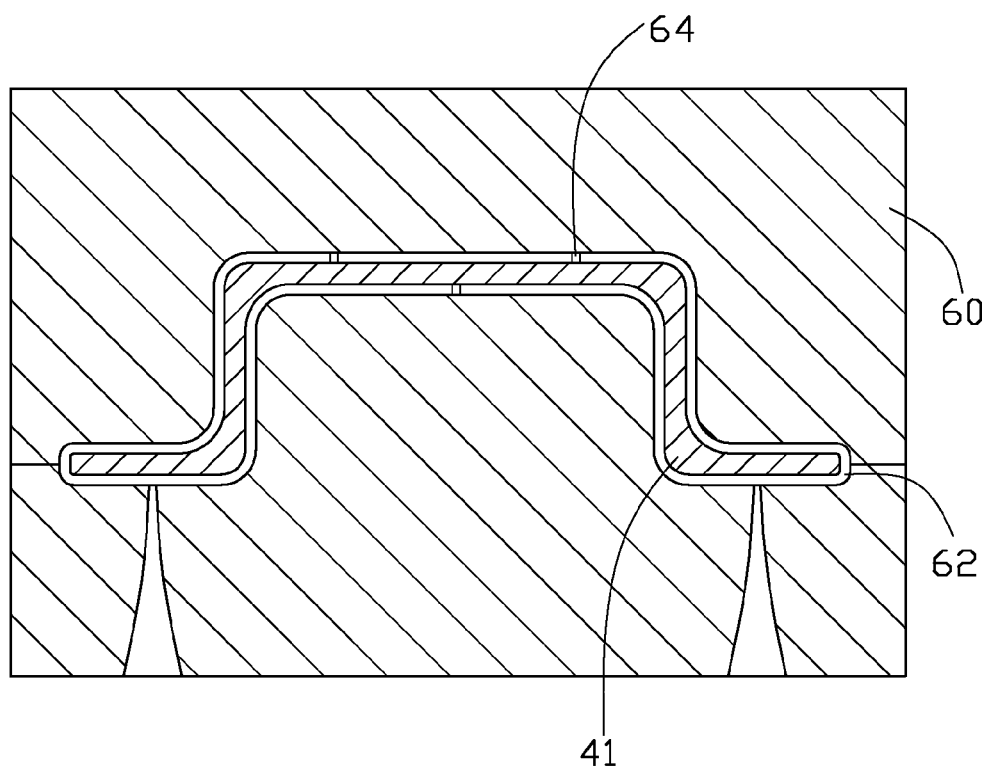
FIG. 4 is a cross-sectional view of a mold for making the magnesium alloy member of FIG. 3 with a magnesium alloy preform in the mold.
Figure 5:
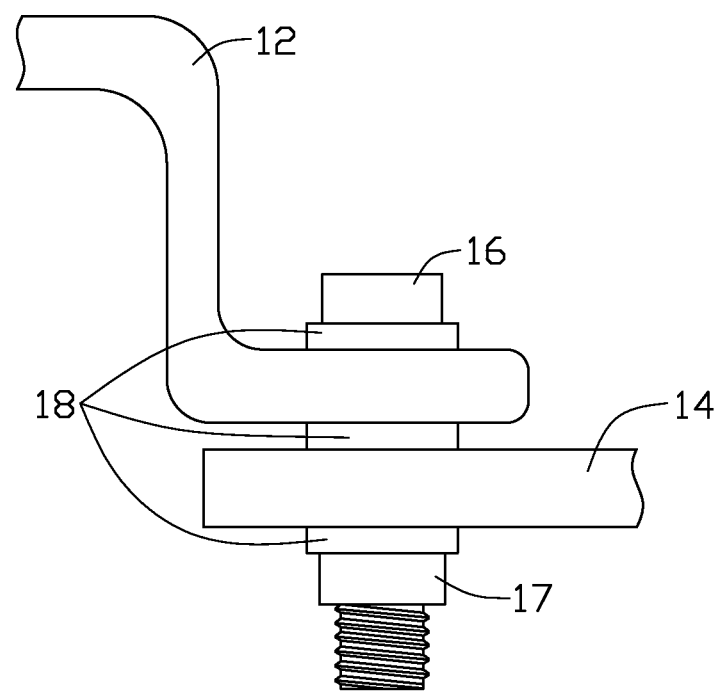
FIG. 5 is an partial, side view of a conventional magnesium alloy sheet coupled with a metallic sheet by a bolt and a nut of a dissimilar material.

Secondly, the MDI foam layer 43 is coated on surfaces of the magnesium alloy base 41. Referring to FIG. 4, a mold 60 and an injection machine (not shown) is provided. The mold 60 includes a first cavity 62. The magnesium alloy base 41 is positioned in a center of the first cavity 62 by a plurality of spacers 64, thereby, defining a foam space to form the MDI foam layer 43. A feed, substantially consisting of 85% wt. MDI pellets and 15% wt. of foaming agent (such as trichlorofluoromethane) uniformly mixed, is fed to a heating cylinder (not shown) of the injection machine for heating the feed to a melted state of about 160° C. degrees. When the feed is heated, gas is produced from the trichlorofluoromethane and enters the melted feed, thereby forming a plurality of air pockets in the melted feed. The melted feed is pushed by an elongated screw of the injection machine at a relative high pressure to shot out via a nozzle of the injection machine into the first cavity 62 of the mold 60. After cooling the mold 60, a MDI foam layer 43 coated on the surfaces of the magnesium alloy base 41 (a magnesium alloy preform) is achieved.

Thirdly, the PU rigid layer 45 is coated on the MDI foam layer 43. This step is similar as the previous step of forming the MDI foam layer 43. A second mold (not shown) having a second cavity (not shown) is provided. The magnesium alloy preform is positioned in the second cavity for defining a suitable space to form the PU rigid layer 45. Polyurethane pellets are fed to the heating cylinder of the injection machine for heating the polyurethane to a melted state. The melted polyurethane is fed to the heating cylinder (not shown) of the injection machine and is pushed by the elongated screw at a relative high pressure, and is shot out via a nozzle of the injection machine into the second cavity of the second mold. Finally, after cooling the mold, a PU rigid layer 45 on the MDI foam layer 43 is achieved.

It should be pointed out that at least two resin coating layers (such as polyethylene foam layer 23, polyethylene rigid layer 25, MDI foam layer 43, and PU rigid layer 45) can be laminated on at least a part of the magnesium alloy base by one of adhesive bond, fusion bond, and so on. Material of the resin coating layers is selected from a group consisting of polyethylene (PE), polypropylene (PP), polyvinyl chloride (PVC), polystyrene (PS), polyurethane (PU), urea formaldehyde (UF), phenol formaldehyde resin (PF), ethylene resin (ER), acrylonitrile-butadiene-styrene (ABS), polymethyl methacrylate (PMMA), polycarbonate (PC), polytetrafluoroethylene (PTFE), polyimide (PI), and their combination. In addition, many additive agents can be mixed into at least one of the resin coating layers for increasing any other characters, such as density, light, rigid, heat resistance, or sound insulation characters.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A fastening assembly, comprising:
   a magnesium alloy member comprising:

a magnesium alloy base, and at least one resin coating layer formed in at least one portion of the magnesium alloy base; wherein the magnesium alloy member defines a through hole penetrating through the magnesium alloy base and the at least one resin coating layer;

a metallic sheet defining a through hole;

a metallic bolt extending through the through hole of the magnesium alloy base and the through hole of the metallic sheet, wherein an inner width of the through hole of the magnesium alloy member is greater than a width of the metallic bolt, a material of the metallic bolt is different from a material of the magnesium alloy base or a material of the metallic sheet; and a nut positioned on an end of the bolt and attached to the metallic sheet.

2. The fastening assembly of claim 1, wherein the metallic bolt is a steel bolt.

3. The fastening assembly of claim 1, wherein except an inner surface of the through hole in the magnesium base, an outer surface of the magnesium base is covered by the at least one resin coating layer.

4. The fastening assembly of claim 1, wherein the magnesium alloy member is used as an oil pan for protecting an engine of automobile.

* * * * *